United States Patent [19]

Sugiyama et al.

[11] Patent Number: 5,313,664
[45] Date of Patent: May 17, 1994

[54] POINT OF SALE SYSTEM HAVING BACKUP FILE DEVICE

[75] Inventors: Mikihiko Sugiyama, Hiratsuka; Hiromi Yamamoto, Isehara; Jincheng Yang, Hiratsuka, all of Japan

[73] Assignee: NCR Corporation, Dayton, Ohio

[21] Appl. No.: 979,358

[22] Filed: Nov. 20, 1992

Related U.S. Application Data

[63] Continuation of Ser. No. 762,790, Sep. 19, 1991, abandoned, which is a continuation of Ser. No. 316,271, Feb. 27, 1989, abandoned.

[30] Foreign Application Priority Data

Mar. 25, 1988 [JP] Japan .................... 63-69961

[51] Int. Cl.⁵ .................... G06F 12/16; G07G 1/12
[52] U.S. Cl. .................... 364/405; 395/575; 371/10.1; 364/DIG. 2; 364/918; 364/918.5; 364/943.9; 364/943.91; 364/944.2; 902/22
[58] Field of Search .............. 364/405; 235/375, 381; 902/22; 395/575, 600; 371/8.1, 9.1, 10.1

[56] References Cited

U.S. PATENT DOCUMENTS

| | | | |
|---|---|---|---|
| 3,596,256 | 7/1971 | Alpert et al. | 395/275 |
| 3,852,571 | 12/1974 | Hall et al. | 235/61.7 B |
| 3,866,175 | 2/1975 | Seifert, Jr. et al. | 340/825.1 |
| 4,319,326 | 3/1982 | Uchida | 364/405 |
| 4,468,750 | 8/1984 | Chamoff et al. | 364/900 |
| 4,502,120 | 2/1985 | Ohnishi et al. | 364/405 |
| 4,528,643 | 7/1985 | Freeny, Jr. | 364/900 |
| 4,594,664 | 6/1986 | Hashimoto | 364/405 |
| 4,623,964 | 11/1986 | Getz et al. | 364/401 |
| 4,683,536 | 7/1987 | Yamamoto | 364/408 |
| 4,859,838 | 8/1989 | Okiharu | 235/383 |
| 4,873,631 | 10/1989 | Nathan et al. | 364/405 |

FOREIGN PATENT DOCUMENTS 0187046 7/1986 European Pat. Off. .
0187523 7/1986 European Pat. Off. .
60-136855 of 0000 Japan .

OTHER PUBLICATIONS

EP,A, 0187523 (Fujitsu) 16 Jul. 1986.
EP,A, 0187046 (Fujitsu) 9 Jul. 1986.
Japan Patent Abstract, vol. 9, No. 304, (P-409)[2027], Nov. 30, 1985.

Primary Examiner—Paul V. Kulik
Attorney, Agent, or Firm—Craig E. Miller; George J. Muckenthaler

[57] ABSTRACT

A file control system includes a master terminal and a backup terminal, a plurality of satellite terminals, a master file and a backup file, and a file controller for each file. The master file responds to a request for price look up from any of the satellite terminals regardless of any operation of the master terminal or the backup terminal. The master file or the backup file acts or operates as the main operating file to update the system when the other file is down.

19 Claims, 4 Drawing Sheets

POINT OF SALE SYSTEM HAVING BACKUP FILE DEVICE

This is a continuation of Ser. No. 762,790, filed on Sep. 19, 1991 which is a continuation of Ser. No. 316,271, filed Feb. 27, 1989 both abandoned.

CROSS-REFERENCE TO RELATED APPLICATIONS

File Backup System, Ser. No. 316,272 filed Feb. 27, 1989, invented by Jiro Naito and Fumio Ito and assigned to NCR Corporation, now U.S. Pat. No. 5,060,185.

Link Control System, Ser. No. 316,270 filed Feb. 27, 1989, invented by Sadao Morita, Hauro Shimasaki, and Kiyohiko Tsutsumi and assigned to NCR Corporation, now U.S. Pat. No. 5,058,057.

BACKGROUND OF THE INVENTION

In the field of data processing, the use of point of sale (POS) terminals has required and also has enabled rapid and accurate transfer of information from one location to another in a business operation. In the case of department stores, the sales data must be transmitted or communicated from one or more terminals throughout the store to a central computer or processing unit.

A filing system is used to provide and maintain inventory and price data on the huge number of items that are sold in the store. The filing system and the control therefor provide means for retrieving and updating data and information regarding the constantly changing inventory and prices for the overall operation.

Representative documentation in the field of file control systems includes Japanese Patent Spec. No. 209642/87 which discloses point of sale data files provided in a master terminal and in a backup master terminal and wherein both terminals update the data files in response to a request from a satellite terminal and transmit PLU (price look up) data to the satellite terminals.

U.S. Pat. No. 4,319,326, issued to Y. Uchida on Mar. 9, 1982, discloses a plurality of electronic cash registers and a consolidator unit which includes means for storing data corresponding to data for each operator of the registers.

U.S. Pat. No. 4,468,750, issued to M. E. Chamoff et al. on Aug. 28, 1984, discloses a system of smart terminals and a dumb controller coupled by means of a communications link. Each of the terminals has a programmable digital processor, entry devices and display devices.

U.S. Pat. No. 4,502,120, issued to S. Ohnishi et al. on Feb. 26, 1985, discloses a system for data transmission between slave cash registers and a master register wherein a transmitting device divides the data into parts and the capacity of a receiving device is identical with the capacity of a memory device.

U.S. Pat. No. 4,528,643, issued to C. C. Freeny on Jul. 9, 1985, discloses a system for reproducing information in material objects such as tapes, recordings, games, motion pictures, etc. at point of sale locations from a remote location in response to receiving an owner authorization code from the owner of the information.

U.S. Pat. No. 4,594,664, issued to K. Hashimoto on Jun. 10, 1986, discloses a master cash processing unit and a plurality of slave units wherein the aggregated sales data is identified by codes associated with each lot of data and is sent to the master unit.

U.S. Pat. No. 4,623,964, issued to M. E. Getz et al. on Nov. 18, 1986, discloses a homogeneous hierarchical computer business system wherein terminals have switches to couple them to one of two alternate bus structures, ideally to two different controllers, and the controllers maintain files dedicated to attached terminals.

And, U.S. Pat. No. 4,683,536, issued to M. Yamamoto on Jul. 28, 1987, discloses a plurality of credit terminals and one of such terminals collects sales data from other terminals and transmits such data to the host computer.

In a conventional point of sale system, a master file contained therein has to perform numerous operations such as control of communications with a satellite terminal, data collection, counting operations, issuance of reports and like operations. Additionally, the master file may have to provide registration of sold goods similar to operations performed by the satellite terminal so that with such additional operation the master file cannot respond in rapid manner to a request from the satellite terminal. Further, it is known that peripheral devices such as a keyboard, a display, a printer, or a bar code reader may fail and thus add to the load imposed on the master file or the problems associated therewith.

Still further, it is known that when one or more of the peripheral devices, which are not directly related or associated with the file controller, fail in operation or something goes wrong in the operation, the master file needs to be slaved down in order to solve the problem. If the system includes a backup master file, more burdens are imposed on the backup file and the system cannot respond to requests from satellite terminals in rapid manner. Since the data file of a backup master file needs to be updated in accordance with the transmission of data from a satellite terminal, more burdens are also imposed on the satellite terminal.

SUMMARY OF THE INVENTION

The present invention relates to a file control system in a point of sale (POS) system for processing sales information or data on sold goods. The sales information or data is input to the file control system from a plurality of individual satellite POS terminals. The file control system is constructed such that when a file device including a data file and a file controller is down or fails in operation, a backup file device automatically takes over the processing of the sales information on the sold goods.

In accordance with the present invention, there is provided a point of sale system comprising a plurality of satellite terminals adapted to input sales information on sold goods, a master terminal and a master backup terminal coupled to the satellite terminals to transmit and to receive sales information, and file control means coupled with the master terminal and with the master backup terminal and with the satellite terminals and including a data file and a file controller adapted to retrieve and update the data file when polling said master terminal and said satellite terminals during predetermined time intervals in a cycle of operation, the updating of the data file being in response to requests from the master terminal, from the master backup terminal and from the satellite terminals and to control communication of data with the terminals from which the requests are made, the file control means comprising at least two file devices wherein one file device operates as a main file device to control data communication and the other file device operates as a main file device upon failure of said main file device, wherein the file controller controls the communication of point of sale data with the respective terminal.

In view of the above discussion, a principal object of the present invention is to provide a file control system in a POS system which can respond rapidly to a request from a satellite terminal.

Another object of the present invention is to provide a file control system for a plurality of satellite terminals wherein the operational failure rate of the various devices in the system is reduced.

An additional object of the present invention is to provide a master file and a backup file each having an associated file controller and coupled to a plurality of satellite terminals for providing rapid transmission of data among the files and the terminals.

A further object of the present invention is to provide a POS system including a master file and a backup file, a file controller for each file, a master terminal and a backup master terminal coupled with a plurality of satellite terminals wherein one of the files acts as a main file and one of the remaining files acts as a backup file, and the main file controls the updating of the backup file to reduce the burdens on the terminals.

Additional advantages and features of the present invention will become apparent and fully understood from a reading of the following description taken together with the annexed drawing.

DESCRIPTION OF THE PREFERRED EMBODIMENT

Figure 1:
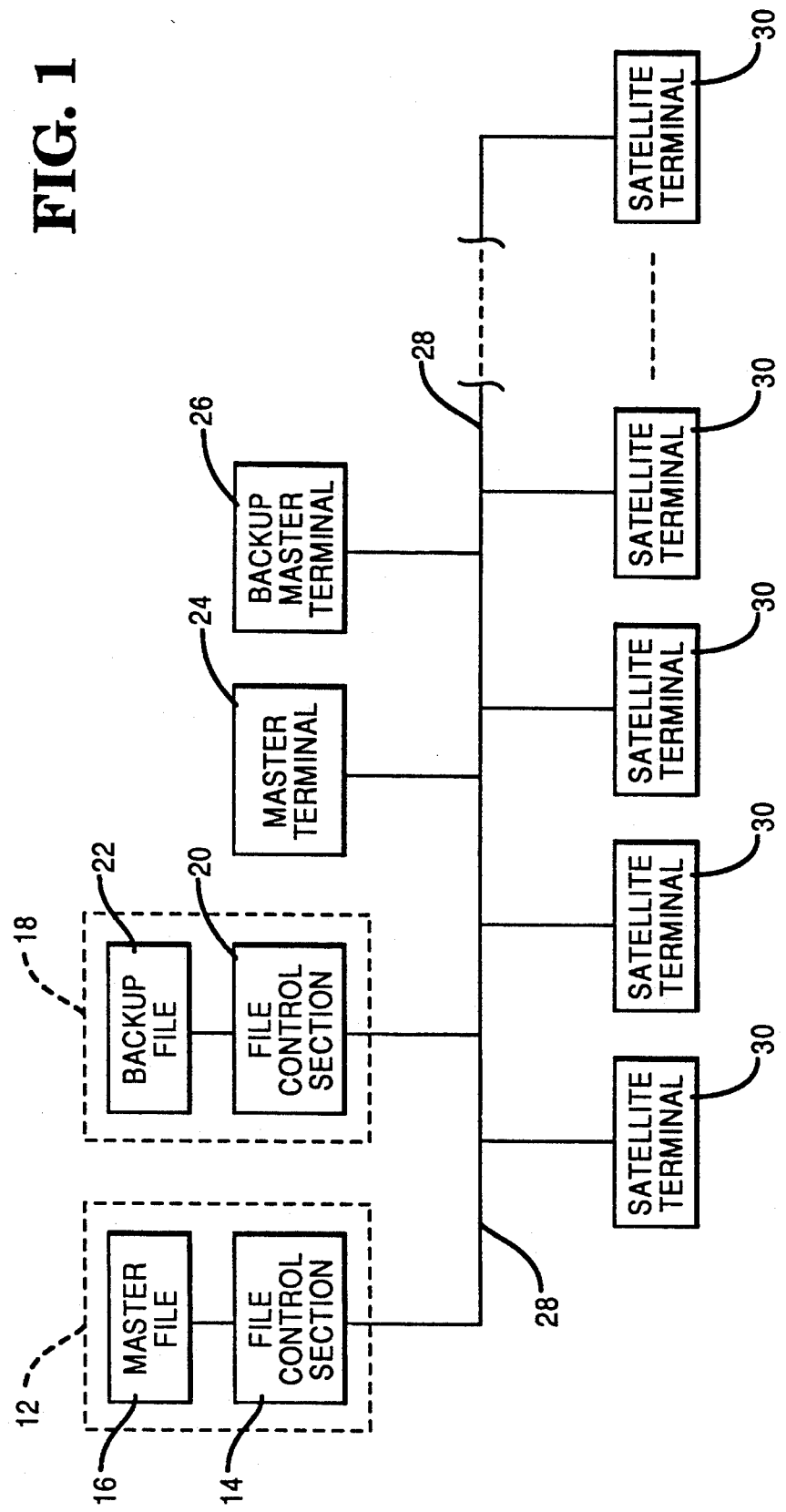
FIG. 1 is a block diagram showing the structure of the file control system for use in a POS system according to a preferred embodiment of the present invention.

FIG. 1 is a block diagram showing the structure of a preferred embodiment of the present invention. In the drawing, a main file device 12 includes a file controller or file control section 14 and a master file 16 in which point of sale (POS) data is stored. A backup file device 18 includes a file controller or file control section 20 and a backup file 22 in which POS data is stored. The file controller 20 has the same structure as file controller 14 and the backup file 22 is the same as the master file 16. A master terminal 24 and a backup master terminal 26 are coupled by means of an in-house communication line 28. The master terminal 24 and the backup master terminal 26 do not include a POS data file. A plurality of satellite terminals 30 each consisting of a POS terminal such as an electronic cash register (ECR) or the like are coupled to the terminals 24 and 26 and to the file devices 12 and 18.

The master terminal 24 and the backup master terminal 26 are constructed in the same manner as that of a conventional master terminal and a backup master terminal except that a POS data file and a file control section to control the POS data file are not included in the terminals 24 and 26. Each of the satellite terminals 30 is constructed in the same manner as that of a conventional POS terminal such as an ECR or the like. It is to be noted that although the backup master terminal 26 is provided in this embodiment, the number of backup files 22 to be provided can be freely selected. Additionally, while one backup file device 18 is provided, a plurality of such backup devices may be provided as required.

In the overall operation of the system as illustrated in FIG. 1, the main file device 12 confirms whether or not transmitting or receiving of data is requested while sequentially polling the individual terminals 24, 26 and 30 within the system in the course of a predetermined cycle. When a customer buys goods, the codes thereof and the number of goods thus sold are input from a bar code reader (not shown) or a keyboard (not shown) of any one of the master terminal 24 or the backup terminal 26 or the satellite terminal 30. The goods codes and the number of sold goods (hereinafter referred to as sales information) are transmitted over the line or circuit 28 to the main file device 12 in the case of polling from such main file device 12.

When the main file device 12 receives the sales information from the terminal 24, 26 or 30, the main file device 12 transmits the sales information to the backup file device 18 and simultaneously retrieves the corresponding goods codes from the master file 16. When the main file device 12 retrieves the corresponding goods codes from the master file 16, the main file device 12 updates the sales information relating to the corresponding goods codes and transmits goods data (prices or the like) corresponding to the goods codes to the terminal 24, 26 or 30 from which the sales information is transmitted. The terminal 24, 26 or 30 which receives the transmitted goods data from the main file device 12 registers the sold goods based on the received goods data. Additionally, the backup file device 18 which receives the sales information from the main file device 12 updates the backup file 22 in the same manner as that of the main file device 12.

Next is a description of the operation in a case in which the main file device 12 slows down. Since the main file device 12 polls the backup file device 18 in the predetermined cycle, the backup file device 18 considers that the main file device 12 slows down when no polling from the main file device 12 is made for a predetermined period of time. The backup file device 18 then controls the data communication with each of the terminals 24, 26 or 30 and operates as the main file device of the system.

Figure 2:
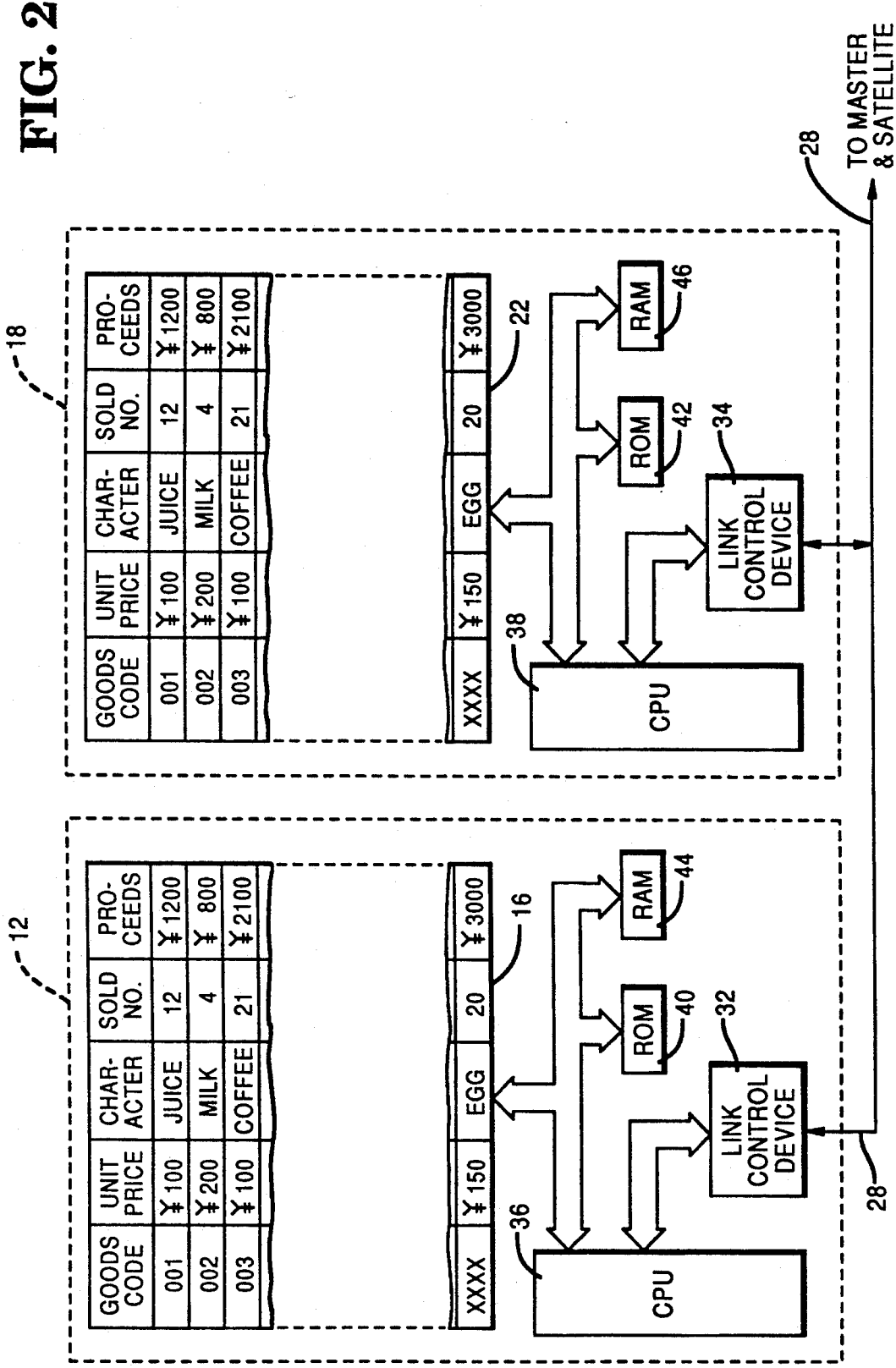
FIG. 2 is a block diagram showing the structures of the main file device and of the backup file device according to the present invention.

As shown in FIG. 2, the main file device 12 and the backup file device 18, respectively, consist of link control devices 32 and 34, central processing units (CPU) 36 and 38, read only memories (ROM) 40 and 42, random access memories (RAM) 44 and 46, the master file 16 and the backup file 22. The CPU 36, the ROM 40, the RAM 44 and the link control device 32 correspond to the file control section 14 in FIG. 1. The main file device 12 and the backup file device 18 include identical elements and are constructed in exactly the same manner. The files 16 and 22 may be respectively included in the RAMs 44 and 46. Each of the link control devices 32 or 34 is a line control device for controlling the in-house communication line or circuit 28. The operations of the main file device 12 and the backup file device 18, which are described in relation to FIG. 1, are respectively controlled by the CPUs 36 and 38 in accordance with processing procedures respectively stored in the ROMs 40 and 42.

Figure 3:
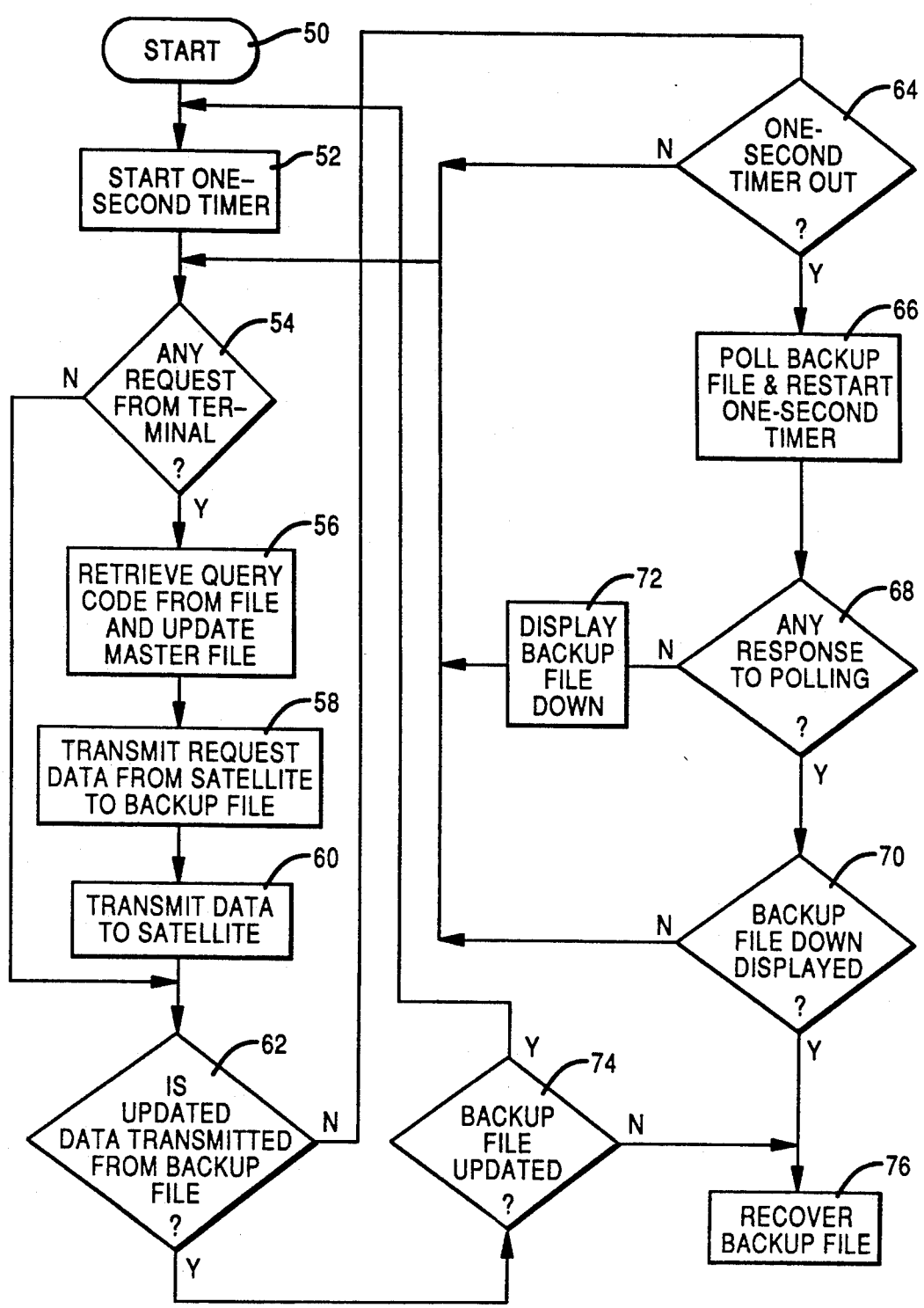
FIG. 3 is a flow chart illustrating the operation of the file control section of the main file device.
Figure 4:
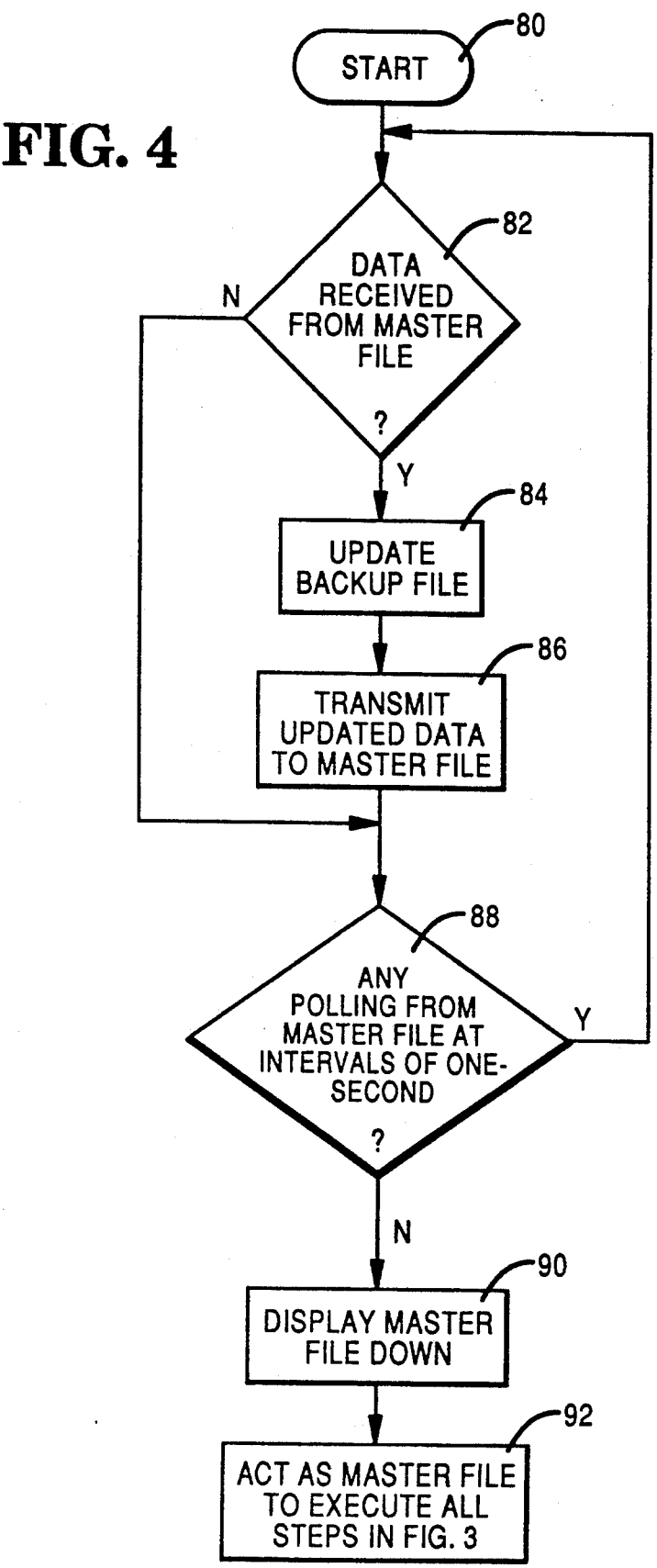
FIG. 4 is a flow chart illustrating the operation of the file control section of the backup file device.

The operations of the file control sections 14 and 20 (FIG. 1) will be described with reference to FIGS. 2, 3 and 4. FIG. 3 is a flow chart showing the operation of the file control section 14 of the main file device 12 and FIG. 4 is a flow chart showing the operation of the file control section 20 of the backup file device 18.

The operation which is performed by the file control section 14 of the main file device 12 in the case wherein no request is sent from a terminal 24, 26 or 30 will be described with reference to FIG. 3. When the power source is turned on to start the operation (block 50), the file control section 14 starts a one-second timer (block 52) in order to poll the backup file device 18 in the predetermined cycle. The file control section 14 confirms whether or not data transmission is requested from the terminal 24, 26 or 30 (block 54) and proceeds to blocks 62 and 64 as a result of the absence of a request from the terminal 24, 26 or 30 to confirm whether the one-second timer is or is not timed out (block 64). When the one-second timer is not timed out, the file control section 14 returns to block 54 to repeat the same process. On the other hand, when the one-second timer is timed out (block 64), the file control section 14 polls the backup file device 18 to restart the one-second timer (block 66) and checks to see whether or not the response to the polling is made from the backup file device 18 (block 68). When the backup file device 18 operates in the normal state, the response to the polling is rapidly made from the backup file device 18, so that the file control section 14 goes to block 70 to confirm the presence of backup file down display indicating that the backup file device 18 is down.

Since no backup down display is made in the case of normal operation of the backup file device 18, the file control section 14 returns from block 70 to block 54 to repeat the same process. Now, assuming that the backup file device 18 is down, no response to the polling is made and hence the file control section 14 returns to block 54 after the backup file down is displayed (block 72) to repeat the processes in block 54 to block 68, inclusive, and in block 72. Assuming that the backup file device 18 has been down and the power source is just turning on at the completion of the repairing thereof, the response to the polling is made from the backup file device 18 (block 68), but the backup file down is displayed (block 70), so that the file control section 14 proceeds to block 76 to perform the processing operation.

This processing operation (hereinafter referred to as the backup file recovery process) is for the purpose of re-preparing the backup file 22, that is, copying the contents that are in the master file 16 to the backup file 22. The backup file recovery process (block 76) is described in detail in copending application (Ser. No. 316,272) filed on the same date as the present application and entitled "File Backup System", now U.S. Pat. No. 5,060,185.

Next is a description of the operation in the case wherein a request is made from a terminal 24, 26 or 30 to the main file device 12 and such operation will be described with reference to FIGS. 2, 3 and 4. When the request is made from the terminal 24, 26 or 30 after the one-second timer is started in block 52 in FIG. 3, the flow proceeds from block 54 to block 56 to retrieve and update the master file 16 based on the goods codes sent from the terminal 24, 26 or 30 and to transmit the sales information or data sent from the terminal 24, 26 or 30 to the backup file device 18 (block 58). At the completion of updating of the master file 16, the sales data such as goods prices and the like are sent to the terminal 24, 26 or 30 from which the request is made (block 60).

The operations in blocks 54 to 60, inclusive, in FIG. 3 will be described with reference to FIG. 2. When the request is made from the terminal 24, 26 or 30, the flow goes from block 54 to block 56. The sales information or data sent from the terminal 24, 26 or 30 is input to the link control device 32 of the main file device 12 on the line or circuit 28 (FIG. 2). The link control device 32 sends the sales information or data thus received to the CPU 36 which, in turn, retrieves the master file 16 in accordance with the process procedure stored in the ROM 40 (block 56) and transmits the sales information or data to the backup file device 18 (block 58). Assuming that the CPU 36 (FIG. 2) receives goods code "002" from the terminal 24, 26 or 30, the CPU finds the record of the goods code "002" in the master file 16 and updates the sales information such as the number of sold goods and the proceeds from the sold goods in the record (block 56). Now, assuming that one carton of milk is sold, the number of sold goods and the proceeds are respectively updated to "5" and " 1000". Then, the CPU 36 (FIG. 2) reads out the unit price of the milk from the master file 12 and sends the unit price thus read out to the request terminal 24, 26 or 30 from which the request is made through the link control device 32 and the line or circuit 28 (block 60).

FIG. 4 illustrates the operation of the file control section 20 of the backup file device 22 and begins with block 80. As shown in FIG. 4, the backup file device 18 checks to see whether or not the sales information or data is sent from the main file device 12 in block 82. Then the CPU 38 (FIG. 2) updates the sales information on the goods code "002" milk in the backup file 22 when the sales information is received, the same as in the case of the updating of the master file 16 (block 84). Then, the CPU 38 transmits the record of the updated goods code "002" to the main file device 12 (block 86). The main file device 12 receives the updated record from the backup file device 18 and compares the record thus received with the record of the goods code "002" in the master file 16 to check to see whether or not the backup file 18 is correctly updated (blocks 62 and 74 in FIG. 3).

In case the backup file 22 is correctly updated, the flow returns to block 52 (FIG. 3) to wait for the next request. However, if the backup file 18 is not correctly updated, the flow goes to block 76 to re-update the record concerned in the backup file 22 or to copy the contents that are in the master file 16 to the backup file 22. Thus, the backup file 22 is always maintained in the same state as that of the master file 16. In the above mentioned manner, the updating of the two files 16 and 22 and the response to the terminal 24, 26 or 30 in the case of the presence of requests from the terminal are thus completed.

Next, the failure detection and backup processing performed by the backup file device 18 when the main file device 16 has failed or is down will be described with reference to FIG. 4. The file control section 20 of the backup file device 18 checks to see whether or not the sales information or data is sent from the main file device 12. If the sales information or data has not been sent, the process goes to block 88 to check to see whether or not the polling from the main file device 12 is made at time intervals of one second. Insofar as the main file device 12 operates in the normal state, the main file device 12 must poll the backup file device 18 at time intervals of one second as noted in blocks 64 and 66 (FIG. 3).

Hence, the backup file device 18 considers the absence of polling from the main file device 12 at intervals of one second as a failure in the main file device 12 and provides a main file down display (block 90) indicating that the main file device 12 has failed or is down. The backup file device 18 then declares that such backup file device acts or operates as the main file device in place of the main file device 12 (after the declaration, the file device 18 becomes the main file device) (block 92) and starts the processing operation normally done by the main file device in FIG. 3. Thereafter, even if the file device 12 is repaired and the power source is turned on, the file device 12 then acts or operates as the backup file device unless the then main file device 18 is slowed down.

As has been described above, the present invention can provide a file control system which can rapidly respond to a request from any of the terminals 24, 26 or 30. The file control system will be dependable due to the provision of the file device in which the master file function and the file control function are separated from the master terminal to provide the master file function and the file control function in addition to the function of the master terminal.

In accordance with the present invention, a file device 12 or 18 includes a file 16 or 22 and a file control section 14 or 20 adapted to retrieve and update the file in response to a request from a master terminal 24 or 26 or from a satellite terminal 30. The file device 12 or 18 provides controlled transmission of price look up (PLU) data and the like to any of the terminals 24, 26 or 30 from which the request is made and to control the data communication with the terminal, thereby ensuring rapid response to the request from the terminal and in-house data communication even when the master file has failed or is down.

Further, in accordance with the present invention, a plurality of file devices 12 or 18 of the type as mentioned above are provided and constructed in such a manner that one of the file devices acts or operates as a main file device and one of the remaining file devices acts or operates as a backup file. The main file device then operating controls the updating of the file data in the other file, thereby reducing the burden on the terminals.

It is thus seen that herein shown and described is a file control system that enables rapid response to requests from terminals. When one of the file devices has failed or is down, another file device becomes the main file device and maintains the operation. The structure and arrangement enable the accomplishment of the objects and advantages mentioned above, and while a preferred embodiment of the invention has been disclosed herein, variations thereof may occur to those skilled in the art. It is contemplated that all such variations not departing from the spirit and scope of the invention hereof are to be construed in accordance with the following claims.

What is claimed is:

1. A point of sale system, comprising:
a plurality of satellite terminals positioned for inputting data on sold goods;
a master terminal coupled to said plurality of satellite terminals to transmit and to receive said data;
file control means for transmitting and receiving said data coupled with said master terminal and with said plurality of satellite terminals, said file control means including a point of sale data file and an associated file control section, said file control section updating said point of sale data file when sequentially polling said master terminal and said plurality of satellite terminals during predetermined time intervals in a cycle of operation, the updating of said point of sale data file by said file control section being in response to requests from said master terminals and said plurality of satellite terminals and said file control section controlling communication of said data with said plurality of satellite terminals and confirming the transmitting and receiving of said data with said plurality of satellite terminals from which the requests are made within a predetermined interval of time; and
said file control means comprising a first file device and a second file device coupled with each other wherein said first file device operates as a main file device to control communication of said data with said master terminal and said plurality of satellite terminals and said second file device is a backup file device which operates as a main file device upon slowing down or failure of said main file device when sequentially polling said master terminal and said plurality of satellite terminals for said predetermined interval of time and said second file device operates to maintain updating of said point of said data file wherein said file control section controls communication of said data with the terminal from which a request is made.

2. The point of sale system in accordance with claim 1, further including an in-house communication line for coupling said master terminal and said plurality of satellite terminals with said file control means.

3. The point of sale system in accordance with claim 1, wherein said polling of said master terminals and said plurality of satellite terminals is performed at one second intervals during said predetermined cycle.

4. The point of sale system in accordance with claim 1, wherein said second file device is a backup file device and operates as a main file device upon failure of said main file device to operate for a predetermined time of one second.

5. The point of sale system in accordance with claim 1, wherein said second file device is a backup file device and operates as a main file device upon slowing down of said main file device for a predetermined time of approximately one second.

6. The point of sale system in accordance with claim 1, wherein said file control means includes first and second data files and first and second file control sections coupled to said master terminal and to said plurality of satellite terminals, one of said data files and one of said file control sections operating to maintain updating of said point of sale data file.

7. The point of sale system in accordance with claim 6, further including an in-house communication line for coupling said mater terminal and said plurality of satellite terminals with said file control means.

8. The point of sale system in accordance with claim 7, wherein said polling of said master terminal and said plurality of satellite terminals is performed at one second intervals during said predetermined cycle.

9. A point of sale system, comprising:
a plurality of satellite terminals positioned for inputting data on sold goods;

a master terminal coupled to said plurality of satellite terminals to transmit and to receive said data;

file control means for transmitting and receiving said data including a first file device and a second file device coupled with said master terminal and with said plurality of satellite terminals, said first file device and said second file device including a point of sale data file and a file control section for updating said point of sale data file when polling said master terminal and said plurality of satellite terminals during predetermined time intervals in a cycle of operation, the updating of said point of sale data files by said file control section being in response to requests from said master terminal and said plurality of satellite terminals and said file control section controlling communication of said data and confirming the transmitting and receiving of said data by said first file device and said second file device with the terminals from which the requests are made within a predetermined interval of time; and said first file device and said second file device being coupled with each other in an arrangement wherein any one of said first file device or said second file device operates as a main file device to control the communication of said data with said master terminal and said plurality of satellite terminals within the point of sale system and to control the updating of said point of sale files of the other of said first file device or said second file device and wherein any one of said first file device or said second file device is a backup file device which automatically operates as a main file device upon slowing down or failure of the main file device when sequentially polling said master terminal and said plurality of satellite terminals within said predetermined interval of time in said cycle of operation to control the communication of said data.

10. The point of sale system in accordance with claim 9, further including an in-house communication line for coupling said master terminal and said plurality of satellite terminals with said first file device and said second file device.

11. The point of sale system in accordance with claim 9, wherein said polling of said master terminal and said plurality of satellite terminals is performed at one second intervals during said predetermined cycle.

12. The point of sale system in accordance with claim 9, wherein said second file device is a backup file device and operates as a main file device upon failure of said main file device to operate within a predetermined time of one second.

13. The point of sale system in accordance with claim 9, wherein said second file device is a backup file device and operates as a main file device upon slowing down of said main file device for a predetermined time of approximately one second.

14. A method of controlling communication of data in a point of sale system having a plurality of satellite terminals coupled with a master terminal, comprising the steps of:

providing a plurality of point of sale data files and associated file control sections in a plurality of file devices for transmitting and receiving said data and for updating said point of sale data files when polling said master terminal and said plurality of satellite terminals during predetermined time intervals in a cycle of operation;

updating said point of sale data files in response to requests from said master terminal and said plurality of satellite terminals and said file control sections controlling communication of said data and confirming the transmitting and receiving of said data by said plurality of file devices with the terminals from which the requests are made within a predetermined interval of time; and arranging said plurality of file devices by coupling said file devices with each other such that any one of said file devices operates as a main file device to control the communication of said data with said plurality of satellite terminals within the point of sale system and to control the updating of said point of sale data files of the remaining file devices wherein any one of the remaining of said plurality of file devices is a backup file device and automatically operates as a main file device upon failure of the main file device to operate when polling said master terminal and said plurality of satellite terminals within said predetermined interval of time in said cycle of operation to control the communication of said data.

15. The method of controlling communication of data in a point of sale system in accordance with claim 14, further including a display which indicates failure of a main file device when any one of said plurality of file devices fails to operate as a main file device to control the communication of said data and to control the updating of said point of sale data files of the remaining of said plurality of file devices and wherein any one of the remaining of said plurality of file devices automatically operates as a main file device upon failure of the main file device.

16. The method of controlling communication of data in a point of sale system in accordance with claim 14, wherein one of the remaining file devices operates as a main file device upon failure of the main file device to operate within a predetermined time of one second.

17. The method of controlling communication of data in a point of sale system in accordance with claim 14, wherein one of the remaining file devices operates as a main file device upon slowing down of the main file device for a predetermined time of approximately one second.

18. The method of controlling communication of data in a point of sale system in accordance with claim 14, wherein said polling of said master terminals and said plurality of satellite terminals is performed at one second intervals during said predetermined cycle.

19. The method of controlling communication of data in a point of sale system in accordance with claim 18, further including a display which indicates failure of a main file device when any one of said plurality of file devices fails to operate as a main file device to control the communication of said data and to control the updating of said point of sale data files of the remaining of said plurality of file devices and wherein any one of the remaining of said plurality of file devices automatically operates as a main file device upon failure of the main file device.

* * * * *

UNITED STATES PATENT AND TRADEMARK OFFICE
CERTIFICATE OF CORRECTION

PATENT NO. : 5,313,664
DATED : May 17, 1994
INVENTOR(S) : Mikihiko Sugiyama et al.

It is certified that error appears in the above-indentified patent and that said Letters Patent is hereby corrected as shown below:

Column 8, line 10, "terminals" should be --terminal--.
Column 8, line 37, "terminals" should be --terminal--.
Column 8, line 60, "mater" should be --master--.
Column 9, line 13, "section" should be --sections--.
Column 9, line 15, "section" should be --sections--.

Signed and Sealed this

Third Day of October, 1995

Attest:

BRUCE LEHMAN

Attesting Officer

Commissioner of Patents and Trademarks